US007634775B2

(12) United States Patent
McLuckie et al.

(10) Patent No.: US 7,634,775 B2
(45) Date of Patent: Dec. 15, 2009

(54) SHARING OF DOWNLOADED RESOURCES

(75) Inventors: Craig I. McLuckie, Redmond, WA (US); Feng Yue, Sammamish, WA (US); Harvinder P Singh, Redmond, WA (US); Khaled S. Sedky, Sammamish, WA (US); Michael Stokes, Eagle, ID (US); Oliver H. Foehr, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 10/938,357

(22) Filed: Sep. 10, 2004

(65) Prior Publication Data
US 2005/0246710 A1 Nov. 3, 2005

Related U.S. Application Data
(60) Provisional application No. 60/568,071, filed on May 3, 2004.

(51) Int. Cl.
*G06F 9/46* (2006.01)
*G06F 3/12* (2006.01)
*G06K 15/00* (2006.01)

(52) U.S. Cl. .................. 718/104; 718/102; 718/100; 358/1.13; 358/1.16

(58) Field of Classification Search .......... 718/100, 718/102, 104; 358/1.13, 1.15, 1.16; 707/104.1; 709/246
See application file for complete search history.

(56) References Cited

U.S. PATENT DOCUMENTS

| 4,410,286 | A |   | 10/1983 | Ko et al. |
| 4,594,674 | A |   | 6/1986  | Boulia et al. |
| 4,649,513 | A |   | 3/1987  | Martin et al. |
| 4,870,611 | A |   | 9/1989  | Martin et al. |
| 5,179,702 | A | * | 1/1993  | Spix et al. .................. 718/102 |
| 5,222,205 | A |   | 6/1993  | Larson et al. |
| 5,469,532 | A | * | 11/1995 | Gerlach et al. ............... 358/1.2 |
| 5,469,533 | A |   | 11/1995 | Dennis |
| 5,487,138 | A |   | 1/1996  | Rust et al. |

(Continued)

OTHER PUBLICATIONS
"SVG Print", W3C Working Draft, Jul. 15, 2003 http://www.w3.org/TR/2003/WD-SVGPrint-20030715/ pp. 1-14.

(Continued)

*Primary Examiner*—Meng-Ai An
*Assistant Examiner*—Caroline Arcos
(74) *Attorney, Agent, or Firm*—Lee & Hayes, PLLC

(57) ABSTRACT

In a described implementation, a production device, such as a computer, produces a shared resources container that includes shareable resources. Each resource of the shared resources container includes a part name and corresponding data. The production device downloads the shared resources container to a utilization device. The production device also formulates a job container, such as a print job. The production device analyzes resource usage of the job container during processing thereof. If a resource relevant to the job container is included in the shared resources container, the resource is excluded from the job container in lieu of a resource reference that is insert therefor. The production device also downloads the job container to the utilization device. At the utilization device, the job container is processed using the resource reference. Specifically, the resource reference is used to retrieve the associated resource from the shared resources container.

38 Claims, 7 Drawing Sheets

U.S. PATENT DOCUMENTS

| | | | |
|---|---|---|---|
| 5,537,526 | A | 7/1996 | Anderson et al. |
| 5,613,124 | A | 3/1997 | Atkinson et al. |
| 5,699,493 | A * | 12/1997 | Davidson et al. ........... 358/1.15 |
| 5,727,220 | A * | 3/1998 | Hohensee et al. ........... 715/234 |
| 5,745,121 | A | 4/1998 | Politis |
| 5,745,122 | A | 4/1998 | Gay et al. |
| 5,745,910 | A | 4/1998 | Piersol et al. |
| 5,752,055 | A | 5/1998 | Redpath et al. |
| 5,752,056 | A | 5/1998 | Celik |
| 5,806,078 | A | 9/1998 | Hug et al. |
| 5,819,295 | A | 10/1998 | Nakagawa et al. |
| 5,845,058 | A | 12/1998 | Shaw et al. |
| 5,903,903 | A | 5/1999 | Kennedy |
| 5,905,504 | A | 5/1999 | Barkans et al. |
| 5,911,138 | A | 6/1999 | Li et al. |
| 5,940,581 | A * | 8/1999 | Lipton ...................... 358/1.11 |
| 5,950,215 | A | 9/1999 | Tabuchi |
| 5,960,168 | A | 9/1999 | Shaw et al. |
| 5,993,088 | A * | 11/1999 | Nogay et al. ................. 400/78 |
| 6,026,416 | A | 2/2000 | Kanerva et al. |
| 6,094,665 | A | 7/2000 | Lyons et al. |
| 6,134,552 | A | 10/2000 | Fritz et al. |
| 6,138,162 | A * | 10/2000 | Pistriotto et al. ............. 709/229 |
| 6,144,974 | A | 11/2000 | Gartland |
| 6,173,295 | B1 | 1/2001 | Goertz et al. |
| 6,182,080 | B1 | 1/2001 | Clements |
| 6,182,096 | B1 | 1/2001 | Mastie et al. |
| 6,195,676 | B1 * | 2/2001 | Spix et al. ................... 718/107 |
| 6,199,082 | B1 | 3/2001 | Ferrel et al. |
| 6,212,530 | B1 | 4/2001 | Kadlec |
| 6,247,018 | B1 | 6/2001 | Rheaume |
| 6,247,066 | B1 | 6/2001 | Tanaka |
| 6,269,403 | B1 | 7/2001 | Anders et al. |
| 6,344,855 | B1 * | 2/2002 | Fisher et al. ................. 345/501 |
| 6,362,870 | B2 | 3/2002 | Mui et al. |
| 6,385,727 | B1 * | 5/2002 | Cassagnol et al. ........... 713/193 |
| 6,407,821 | B1 * | 6/2002 | Hohensee et al. .......... 358/1.15 |
| 6,418,448 | B1 | 7/2002 | Sarkar |
| 6,427,230 | B1 | 7/2002 | Goiffon et al. |
| 6,447,184 | B2 * | 9/2002 | Kimura et al. ............... 400/578 |
| 6,449,653 | B2 | 9/2002 | Klemets et al. |
| 6,457,017 | B2 | 9/2002 | Watkins et al. |
| 6,466,935 | B1 * | 10/2002 | Stuart .......................... 707/10 |
| 6,480,206 | B2 | 11/2002 | Prinzing |
| 6,505,219 | B1 | 1/2003 | MacLean et al. |
| 6,507,858 | B1 | 1/2003 | Kanerva et al. |
| 6,538,760 | B1 | 3/2003 | deBry et al. |
| 6,549,918 | B1 | 4/2003 | Probert, Jr. et al. |
| 6,571,279 | B1 * | 5/2003 | Herz et al. ................... 709/217 |
| 6,583,789 | B1 | 6/2003 | Carlson et al. |
| 6,591,278 | B1 | 7/2003 | Ernst |
| 6,604,144 | B1 | 8/2003 | Anders |
| 6,608,693 | B1 | 8/2003 | Loyd et al. |
| 6,609,200 | B2 | 8/2003 | Anderson et al. |
| 6,615,281 | B1 * | 9/2003 | Temple, III ................. 713/375 |
| 6,654,147 | B1 | 11/2003 | Ramot |
| 6,657,647 | B1 | 12/2003 | Bright |
| 6,658,477 | B1 | 12/2003 | Lisitsa et al. |
| 6,674,540 | B1 | 1/2004 | Wiechers et al. |
| 6,675,353 | B1 | 1/2004 | Friedman |
| 6,675,356 | B1 | 1/2004 | Adler et al. |
| 6,681,223 | B1 | 1/2004 | Sundaresan |
| 6,715,126 | B1 | 3/2004 | Chang et al. |
| 6,763,343 | B1 | 7/2004 | Brooke et al. |
| 6,765,584 | B1 | 7/2004 | Wloka et al. |
| 6,771,291 | B1 | 8/2004 | DiStefano, III |
| 6,781,609 | B1 | 8/2004 | Barker et al. |
| 6,789,229 | B1 | 9/2004 | Dunietz et al. |
| 6,812,941 | B1 | 11/2004 | Brown et al. |
| 6,826,626 | B1 * | 11/2004 | McManus ................... 709/246 |
| 6,867,874 | B1 * | 3/2005 | Shima ........................ 358/1.15 |
| 6,891,632 | B2 | 5/2005 | Schwartz |
| 6,910,843 | B2 | 6/2005 | Saw et al. |
| 6,917,976 | B1 * | 7/2005 | Slaughter et al. ............ 709/226 |
| 6,925,597 | B2 | 8/2005 | Anwar |
| 6,941,511 | B1 | 9/2005 | Hind et al. |
| 6,944,515 | B2 | 9/2005 | Nakajima et al. |
| 6,952,801 | B2 | 10/2005 | Warmus et al. |
| 6,968,557 | B1 * | 11/2005 | Zhang et al. ................. 719/319 |
| 6,990,654 | B2 | 1/2006 | Carroll, Jr. |
| 6,992,785 | B1 * | 1/2006 | Chatcavage et al. ......... 358/1.15 |
| 7,017,162 | B2 * | 3/2006 | Smith et al. .................. 719/328 |
| 7,027,660 | B2 | 4/2006 | Hersch et al. |
| 7,043,688 | B1 | 5/2006 | Tsutsumi et al. |
| 7,047,237 | B2 | 5/2006 | Suzuki et al. |
| 7,051,276 | B1 | 5/2006 | Mogilevsky et al. |
| 7,051,330 | B1 * | 5/2006 | Kaler et al. .................. 718/106 |
| 7,092,963 | B2 | 8/2006 | Ryan et al. |
| 7,103,625 | B1 * | 9/2006 | Hipp et al. ................... 709/201 |
| 7,106,275 | B2 | 9/2006 | Brunner et al. |
| 7,131,060 | B1 | 10/2006 | Azuma |
| 7,134,071 | B2 | 11/2006 | Ohwada et al. |
| 7,136,941 | B2 | 11/2006 | Nguyen et al. |
| 7,162,538 | B1 | 1/2007 | Cordova |
| 7,171,471 | B1 * | 1/2007 | Nair ........................... 709/226 |
| 7,181,731 | B2 | 2/2007 | Pace et al. |
| 7,209,921 | B2 | 4/2007 | Pace et al. |
| 7,271,935 | B2 | 9/2007 | Coons et al. |
| 7,274,483 | B2 | 9/2007 | Aiyama et al. |
| 7,302,634 | B2 * | 11/2007 | Lucovsky et al. ............ 715/200 |
| 7,359,902 | B2 | 4/2008 | Ornstein et al. |
| 7,426,525 | B2 * | 9/2008 | Sayers et al. ............. 707/104.1 |
| 2001/0003828 | A1 | 6/2001 | Peterson et al. |
| 2001/0013043 | A1 | 8/2001 | Wagner |
| 2001/0018697 | A1 | 8/2001 | Kunitake et al. |
| 2001/0043358 | A1 | 11/2001 | Schwartz |
| 2001/0044809 | A1 | 11/2001 | Parasnis et al. |
| 2002/0002667 | A1 * | 1/2002 | Kelsey et al. ................ 712/228 |
| 2002/0049790 | A1 | 4/2002 | Ricker et al. |
| 2002/0065848 | A1 | 5/2002 | Walker et al. |
| 2002/0073236 | A1 | 6/2002 | Helgeson et al. |
| 2002/0085020 | A1 | 7/2002 | Carroll, Jr. |
| 2002/0087602 | A1 | 7/2002 | Masuda et al. |
| 2002/0089691 | A1 | 7/2002 | Fertlitsch et al. |
| 2002/0099797 | A1 | 7/2002 | Merrell et al. |
| 2002/0107886 | A1 | 8/2002 | Gentner et al. |
| 2002/0111133 | A1 | 8/2002 | Wittkotter |
| 2002/0174145 | A1 | 11/2002 | Duga et al. |
| 2002/0188638 | A1 | 12/2002 | Hamscher |
| 2003/0009672 | A1 | 1/2003 | Goodman |
| 2003/0018694 | A1 | 1/2003 | Chen et al. |
| 2003/0028560 | A1 | 2/2003 | Kudrolli et al. |
| 2003/0078829 | A1 | 4/2003 | Chen et al. |
| 2003/0079181 | A1 | 4/2003 | Schumacher et al. |
| 2003/0093520 | A1 | 5/2003 | Beesley |
| 2003/0126136 | A1 * | 7/2003 | Omoigui ...................... 707/10 |
| 2003/0137539 | A1 | 7/2003 | Dees |
| 2003/0149934 | A1 | 8/2003 | Worden |
| 2003/0158851 | A1 | 8/2003 | Britton et al. |
| 2003/0163552 | A1 | 8/2003 | Savitzky et al. |
| 2003/0163589 | A1 * | 8/2003 | Bunce et al. ................ 709/250 |
| 2003/0167356 | A1 * | 9/2003 | Smith et al. ................. 709/328 |
| 2003/0182152 | A1 | 9/2003 | Nakajima et al. |
| 2003/0182311 | A1 | 9/2003 | Nakajima et al. |
| 2003/0182450 | A1 | 9/2003 | Ong et al. |
| 2003/0182656 | A1 | 9/2003 | Leathers et al. |
| 2003/0187534 | A1 | 10/2003 | Suzuki et al. |
| 2003/0187612 | A1 * | 10/2003 | Miyake ...................... 702/176 |
| 2003/0187870 | A1 | 10/2003 | Nakajima et al. |
| 2003/0195784 | A1 | 10/2003 | Smith, Jr. |
| 2003/0229845 | A1 | 12/2003 | Salesin et al. |
| 2003/0233420 | A1 | 12/2003 | Stark et al. |
| 2004/0003388 | A1 | 1/2004 | Jacquemot et al. |
| 2004/0003448 | A1 | 1/2004 | Morrow et al. |

| | | |
|---|---|---|
| 2004/0021905 A1* | 2/2004 | Holmstead et al. ......... 358/1.16 |
| 2004/0032611 A1 | 2/2004 | Daly et al. |
| 2004/0034848 A1 | 2/2004 | Moore et al. |
| 2004/0049737 A1 | 3/2004 | Hunt et al. |
| 2004/0054669 A1 | 3/2004 | Seyrat et al. |
| 2004/0061729 A1 | 4/2004 | Green et al. |
| 2004/0066527 A1 | 4/2004 | Kloosterman et al. |
| 2004/0078755 A1 | 4/2004 | Shinjo et al. |
| 2004/0080764 A1 | 4/2004 | Sievert et al. |
| 2004/0103073 A1 | 5/2004 | Blake et al. |
| 2004/0111418 A1 | 6/2004 | Nguyen et al. |
| 2004/0117733 A1 | 6/2004 | Moreau et al. |
| 2004/0130741 A1 | 7/2004 | Ferlitsch |
| 2004/0139049 A1 | 7/2004 | Hancock et al. |
| 2004/0153467 A1 | 8/2004 | Conover et al. |
| 2004/0160613 A1 | 8/2004 | Kurotsu et al. |
| 2004/0167941 A1 | 8/2004 | Prahlad et al. |
| 2004/0183837 A1 | 9/2004 | Watanabe et al. |
| 2004/0193599 A1 | 9/2004 | Liu et al. |
| 2004/0194025 A1 | 9/2004 | Hubert et al. |
| 2004/0205623 A1 | 10/2004 | Weil et al. |
| 2004/0205653 A1 | 10/2004 | Hadfield et al. |
| 2004/0207869 A1* | 10/2004 | Endo .................. 358/1.15 |
| 2004/0216048 A1 | 10/2004 | Brown et al. |
| 2004/0225960 A1 | 11/2004 | Parikh et al. |
| 2004/0230608 A1 | 11/2004 | Ornstein et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0015767 A1* | 1/2005 | Nash et al. ................ 718/102 |
| 2005/0071385 A1 | 3/2005 | Rao |
| 2005/0086030 A1* | 4/2005 | Zeidman ................. 703/1 |
| 2005/0091574 A1 | 4/2005 | Maaniitty et al. |
| 2005/0099398 A1 | 5/2005 | Garside et al. |
| 2005/0104894 A1 | 5/2005 | Sanborn et al. |
| 2005/0125720 A1 | 6/2005 | Little et al. |
| 2005/0132279 A1 | 6/2005 | Relyea et al. |
| 2005/0138540 A1 | 6/2005 | Baltus et al. |
| 2005/0144556 A1 | 6/2005 | Petersen et al. |
| 2005/0187803 A1 | 8/2005 | Jain et al. |
| 2005/0190186 A1 | 9/2005 | Klassen |
| 2005/0210026 A1 | 9/2005 | Wood |
| 2005/0210227 A1 | 9/2005 | Emerson et al. |
| 2005/0223312 A1 | 10/2005 | Erdtmann et al. |
| 2005/0251742 A1 | 11/2005 | Mogilevsky et al. |
| 2005/0278240 A1 | 12/2005 | Delenda |
| 2005/0278616 A1 | 12/2005 | Eller |
| 2005/0278626 A1 | 12/2005 | Malik |
| 2005/0286063 A1 | 12/2005 | Owen et al. |
| 2006/0031749 A1 | 2/2006 | Schramm et al. |
| 2006/0047743 A1 | 3/2006 | Yuan et al. |
| 2006/0056334 A1 | 3/2006 | Yuan et al. |
| 2006/0080316 A1 | 4/2006 | Gilmore et al. |
| 2006/0117019 A1 | 6/2006 | Sylthe et al. |
| 2006/0117268 A1 | 6/2006 | Talley et al. |
| 2006/0136827 A1 | 6/2006 | Villaron et al. |
| 2006/0146353 A1 | 7/2006 | Yue et al. |
| 2006/0155529 A1 | 7/2006 | Ludviksson et al. |
| 2006/0206794 A1 | 9/2006 | Ornstein et al. |
| 2008/0021923 A1 | 1/2008 | Sedky et al. |

OTHER PUBLICATIONS

"Open eBook Publication Structure 1.2", Aug. 27 2002, 91 pages.
"Networked File System"; http://www.scit.wlv.ac.uk/~jphb/comms/nfs.htm.; 6 pages.
"Apache Server Frequently Asked Questions"; Apache HTTP Server Version 1.3; http://httpd.apache.org/docs/misc/FAQ.html.; 35 pages.
"URIQA! The URI Query Agent Model, A Semantic Web Enabler"; URIQA: The Nokia Query Agent; http://sw.nokia.com/uriqa/URIQA.html.; 9 pages 2004.
"XMP Adding Intelligence to Media"; XMP Specification, Jan. 2004, 11 pages.
"Controlling the Data Chaos by Adding Intelligence to Media"; 4 pages. 2004.
"SOAP Version 1.2 Part 1: Messaging Framework"; W3C Proposed Recommendation May 7, 2003; http://www.w3.org/TR/2003/PR-soap12-part1-20030507. 25 pages.
"Interleaved Graphics and Text" Bluethman et al., IBM Technical Disclosure Bulletin, Apr. 1980, vol. 22, No. 11., pp. 4813-4815.
Efficient Representation and Streaming of XML Content Over the Internet Medium Girardot et al., IEEE 2000 pp. 67-70.
Miller; "An Introduction to the Resource Description Framework"; D-Lib Magazine, May 1998; ISSN 1082-9873; http://www.dlib.org/dlib/may98/miller/05miller.html. 10 pages.
"@tryinCSS3 (was Useragent Rules in CSS)"; Mar. 31, 2004 http://lists.w3.org/Archives/Public/www-style/2004Mar/0333.html.; 2 pages.
"[Editorial Draft] Versioning XML Languages"; Proposed TAG Finding Nov. 16, 2003; http://www.w3.orq/2001/taq/doc/versioning-20031116; 23 pages.
Holman; "What is XSL-FO", Google Mar. 20, 2002, pp. 1-4.
Pawson; "Printing from XML: An Introduction to XS:L-FO", Google Oct. 9, 2002, pp. 1-4.
El-Kwae, et al.; "Document Image Representation Using XML Technologies"; Proceedings of SPIE, vol. 4670, 2001, pp. 109-120.
Christodoulakis, et al.; "Multimedia Document Presentation, Information Extraction, and Document Formation in MINOS: A Model and a System"; ACM Transaction on Office Information Systems, vol. 4, No. 4; Oct. 1986; pp. 345-383.
Orchard et al "[Editorial Draft] Versioning XML Languages W3C Proposed TAG finding." Nov. 16, 2003, pp. 1-23.
Jacobs et al.; "Adaptive Grid-Based Document Layout"; 2003 ACM; pp. 838-847.
Chien, et al., "Effcient Schemes for Managing Multiversion XML Documents", University of California, California, Dec. 19, 2002, pp. 332-353.
Han, et al., "WebSplitter:A Unified XML Framework for Multi-Device Collaborative web browsing" IBM Thomas J. Watson research Centre, Hawthorne, CSCW, Dec. 2-6, 2000, ACM 1-58113-222-0/00/0012, pp. 221-230.
Peters et al.,"CrystalWeb—A distributed authoring environment for the World-Wide Web" Computer Networks and ISDN Systems, North Holland Publishing. Amsterdam, NL. vol. 27, No. 6, Apr. 1995, pp. 861-870.
Hardy, et al., "Mapping and Displaying Structural Transformations between XML and PDF", ACM, 2002, pp. 95-102.
Marco, et al., "A Framework for Designing and Implementing the Ada Standard Container Library", ACM 2003, pp. 49-61.
Orchard, "Versioning XML Vocabularies", published on XML.com, Dec. 3, 2003, pp. 1-10.
Official Notice of Rejection for China Patent Application No. 200480001329.4, Dec. 18, 2007, pp. 1-16.
Ellis et al., "Postscrip, Bezier Curves and Chinese Character", ACM, 1989, pp. 162-165.
"Adobe Photoshop Release History", Wikipedia, Oct. 28, 2008, pp. 1-7.
Levy, et al., "Non-Distorted Texture Mapping for Sheared Triangulated Meshes", The 25th Conference on Computer Graphics and Interactive Techniques, ACM, 1998, pp. 343-352.
Shade, et al., "Layered Depth Images", The 25th Annual Conference on Computer Graphics and Interactive Techniques, ACM, 1998, pp. 231-242.
"Supported File Formats Photoshop Elements 5.0", retrieved at <<http://www.adobe.com/cfusion/knowledgebase/index.cfm?id=330350>>, Sep. 5, 2007, pp. 1-6.
"Windows NT 4.0", Wikipedia, Nov. 6, 2008, pp. 1-9.
"Windows NT Server Printing", retrieved on Nov. 17, 2008 at <<http://www.microsoft.com/resources/documentation/windowsnt/4/server/reskit/en-us/resg...>>, 2008, pp. 1-35.
Ashcraft, et al., "SPOOLES: An Object-Oriented Sparse Matrix Library", retrieved on Jan. 21, 2009 at <<http://citeseerx.ist.psu.edu/viewdoc/summary?doi=10.1.1.44.5809>>, Proceedings of the 9th Siam Conference on Parallel Processing for Scientific Computing, 1999, pp. 1-10.

Reguero, et al., "Large Scale Print Spool Service", retrieved on Jan. 21, 2009 at <<http://citeseerx.ist.psu.edu/viewdoc/summary?doi=10.1.1.107.7406>>, Proceedings of the Twelfth Systems Administration Conference (LISA 1998), Boston, Massachusetts, Dec. 6-100, 1998, pp. 1-15.

Akerlof, "The Market for "Lemons": Quality Uncertainty and the Market Mechanism", Quarterly Journal of Economics, vol. 84, Issue 3, Aug 1970, pp. 488-500.

Devanur et al., "An Improved Approximation Scheme for Computing Arrow-Debreu Prices for the Linear Case", retrieved on Nov. 10, 2008 at <<http://www.cc.gatech.edu/~nikhil/pubs/fsttcs.pdf>>, 2003, pp. 1-8.

Geanakoplos, "The Arrow-Debreu Model of General Equilibrium", retrieved on Nov. 10, 2008 at <<cowles.econ.yale.edu>>, Cowles Foundation for Research in Economics at Yale University, 2004.

Jain, "A Polynomial Time Algorithm for Computing an Arrow-Debreu Market Equilibrium for Linear Utilities", Proceedings of the 45th Annual IEEE Symposium on Foundations of Computer Science (FOCS '04), IEEE, 2004, pp. 1-9.

Jain et al., "Approximating Market Equilibria", Springerlink, LNCS 2764, 2003, pp. 1-11.

Eisenberg, et al., "Consensus of Subjective Probabilities: The Pari-Mutuel Method", Annals of Mathematical Statistics, vol. 30, No. 1, Mar. 1959, pp. 165-168.

* cited by examiner

SHARING OF DOWNLOADED RESOURCES

CROSS-REFERENCE(S) TO RELATED APPLICATION(S)

This nonprovisional patent application claims the benefit of priority from co-pending provisional patent application No. 60/568,071, filed on May 3, 2004, entitled "Sharing of Downloaded Resources". This nonprovisional patent application hereby incorporates by reference herein the entire disclosure of provisional patent application No. 60/568,071.

TECHNICAL FIELD

This disclosure relates in general to the sharing of downloaded resources and in particular, by way of example but not limitation, to the sharing of resources downloaded into the memory of a device across different pages, tasks, files, jobs, and/or downloads.

BACKGROUND

Computers and printers jointly print many different types of documents. Documents may be pamphlets, newspapers, catalogs, magazines, reports, and so forth. Such documents may exhibit black and white, grayscale, and/or color items. Such items may be text, graphics, pictures, and so forth.

In operation, a computer under the direction of a user creates a document that is to be printed. The document, or at least a printer-compatible file version thereof, is sent to a printer. The document that the computer sends to the printer includes all of the text, graphics, pictures, etc. information on a page-by-page basis that the printer needs to render the document in hardcopy form. When the user wishes to print a subsequent document, the computer again sends to the printer all of the information on a page-by-page basis that the printer needs to render this subsequent document.

Accordingly, there is a need for schemes and/or techniques that can accelerate document printing and/or facilitate efficient computer-printer interaction.

SUMMARY

A production device, such as a computer, produces a shared resources container that includes shareable resources. The production device downloads the shared resources container to a utilization device. The production device also formulates a job container, such as a print job. During processing of the job container, the production device analyzes the resource usage thereof. If a resource relevant to the job container is included in the shared resources container, the resource is excluded from the job container in lieu of a resource reference that is inserted therefor. The production device also downloads the job container to the utilization device. At the utilization device, the job container is processed using the resource reference. Specifically, the resource reference is used to retrieve the associated resource from the shared resources container.

In an alternative implementation, shared resources can be downloaded from the production device to the utilization device in job containers. For example, a shared resource can be included along with job-specific resources in a job container, but the shared resource is marked or otherwise identified as a resource to be retained for possible future sharing. The shared resource can be retained by including it in a shared resources container stored at the utilization device.

In a described implementation, each resource of the shared resources container includes a part name and corresponding data. Additionally, the resource reference of the job container and the part name of the shared resources container comprise uniform resource identifiers (URIs). Generally, utilization devices may print, display, distribute, and/or archive, etc. downloaded job containers.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

In a computer and printer implementation example, a computer produces a shared resources container that includes one or more resources. The computer downloads the shared resources container to the printer. The printer stores the shared resources container for subsequent reference thereto. The computer may thereafter produce a job container that represents a document to be printed by the printer. The job container includes at least one resource reference that points to a resource included in the shared resources container in lieu of embedding the actual resource in the job container. Alternatively, shared resources can be downloaded from a computer to a printer in job containers by using appropriate shared resource identifications.

The computer also downloads the job container to the printer. When processing the job container for printing of the document thereof, the printer uses the at least one resource reference to retrieve a resource included in the shared resources container. Other job containers may likewise include resource references to the one or more shared resources of the shared resources container. In this manner, resources that are used repeatedly in the printing of multiple documents may be downloaded once.

Example of Environments for Downloaded Resource Sharing

Figure 1:
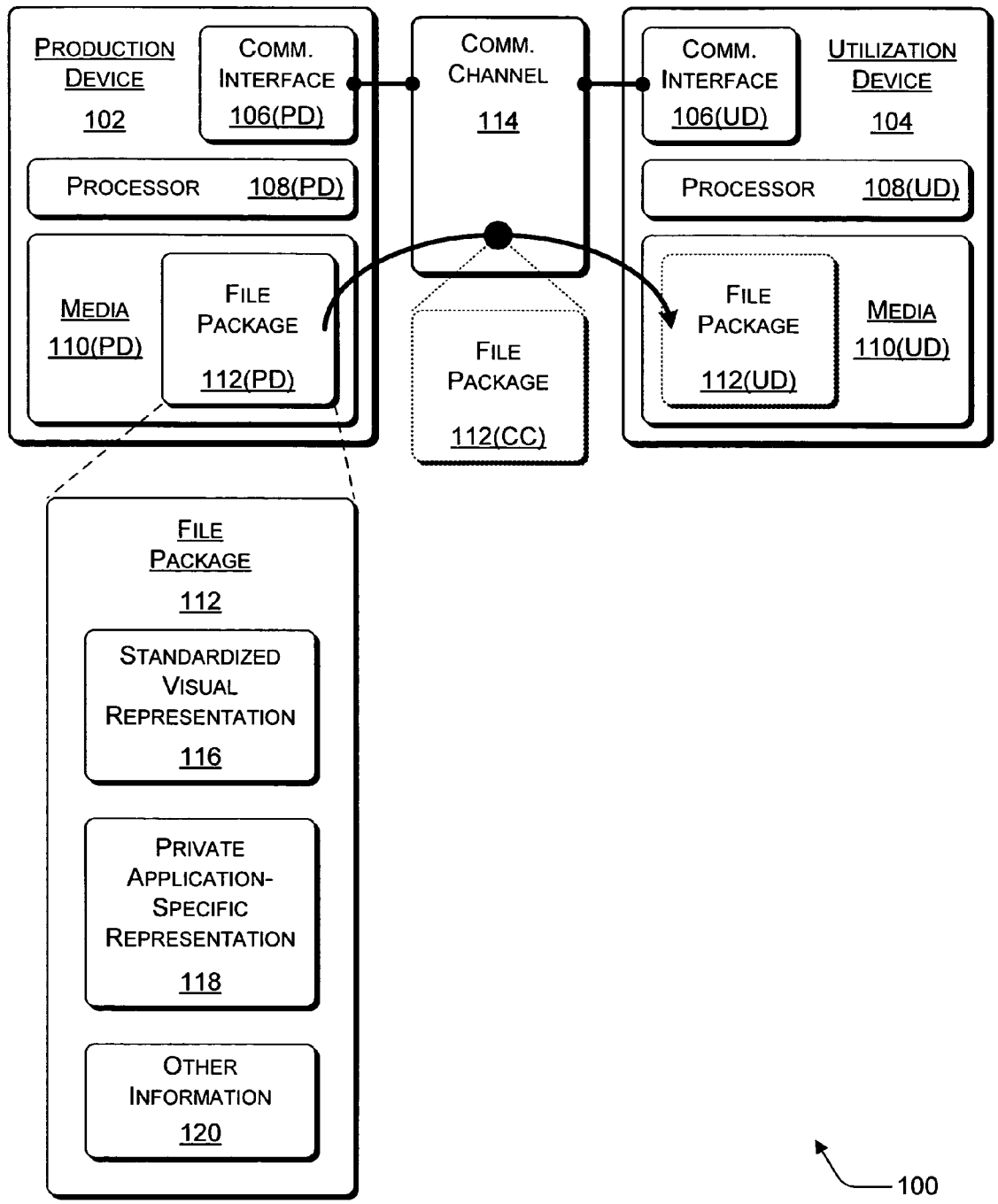
FIG. 1 is an example of a block diagram illustrating a production device and a utilization device with respect to a file package.

FIG. 1 is an example of a block diagram 100 illustrating a production device 102 and a utilization device 104 with respect to a file package 112. Production device 102 is capable of producing file package 112. Production device 102 is adapted to provide file package 112 to utilization device 104 over a communication channel 114 for utilization by utilization device 104.

As illustrated, each of production device 102 and utilization device 104 include one or more processors 108, at least one media 110, and a communication interface 106 that is coupled to communication channel 114. Specifically, production device 102 includes a processor 108(PD), media 110 (PD), and a communication interface 106(PD). Similarly, utilization device 104 includes a processor 108(UD), media 110(UD), and a communication interface 106(UD).

Media 110 typically includes processor-executable instructions that are executable by processor 108 to effectuate functions of devices 102 and 104. Media 110 may be realized as storage or transmission media, volatile or non-volatile media, removable or non-removable media, some combination thereof, and so forth. For example, media 110 may be realized as (i) a volatile random access memory (RAM), (ii) a non-volatile disk-based memory, (iii) a transmission medium, and/or (iv) a propagating signal. Communication channel 114 may be comprised of one or more wireless and/or wired links that directly interconnect communication interfaces 106 or that indirectly interconnect them across one or more networks (not explicitly shown). Additional details and examples of devices, processors, media, communication mechanisms, and so forth are described further below with reference to FIG. 7.

In a described implementation, file package 112 includes a standardized visual representation 116, a private application-specific representation 118, and other information 120. Standardized visual representation 116 and private application-specific representation 118 can exist in parallel within a single file package 112. Standardized visual representation 116 includes data that enables display of the content in a platform independent manner using, for example, a platform-independent application viewer (not shown). Private application-specific representation 118 includes data that enables display (and manipulation) of the content using, for example, a proprietary internal format. When the various parts of file package 112 are bundled into a single file, such a single file may be considered a container.

Although shown separately as discrete units, standardized visual representation 116 and private application-specific representation 118 may actually be at least partially overlapping, interrelated, and even interdependent. In other words, they may share content information and/or formatting data. Other information 120 represents any additional information and/or metadata included in file package 112 that may be useful for or related to: authorship information, version monitoring, content change tracking, routing information, compatibility information, other visual or non-visual representations, printing information, digital rights management (DRM), and so forth.

As illustrated, production device 102 produces file package 112(PD). Production device 102 transmits file package 112 (PD), including a copy thereof, across communication channel 114 via communication interface 106(PD). File package 112(CC) propagates along communication channel 114. Utilization device 104 receives file package 112(UD) through communication channel 114 via communication interface 106(UD). Upon receipt, utilization device 104 may utilize file package 112(UD) depending on the intended or stipulated use and/or capabilities of utilization device 104. For example, utilization device 104 may be capable of printing, displaying/viewing, distributing, archiving, etc. file package 112(UD). Although not so illustrated, an application (e.g., a file-package-capable viewer) on production device 102 may utilize file package 112 in lieu of or in addition to utilization at utilization device 104.

Figure 2:
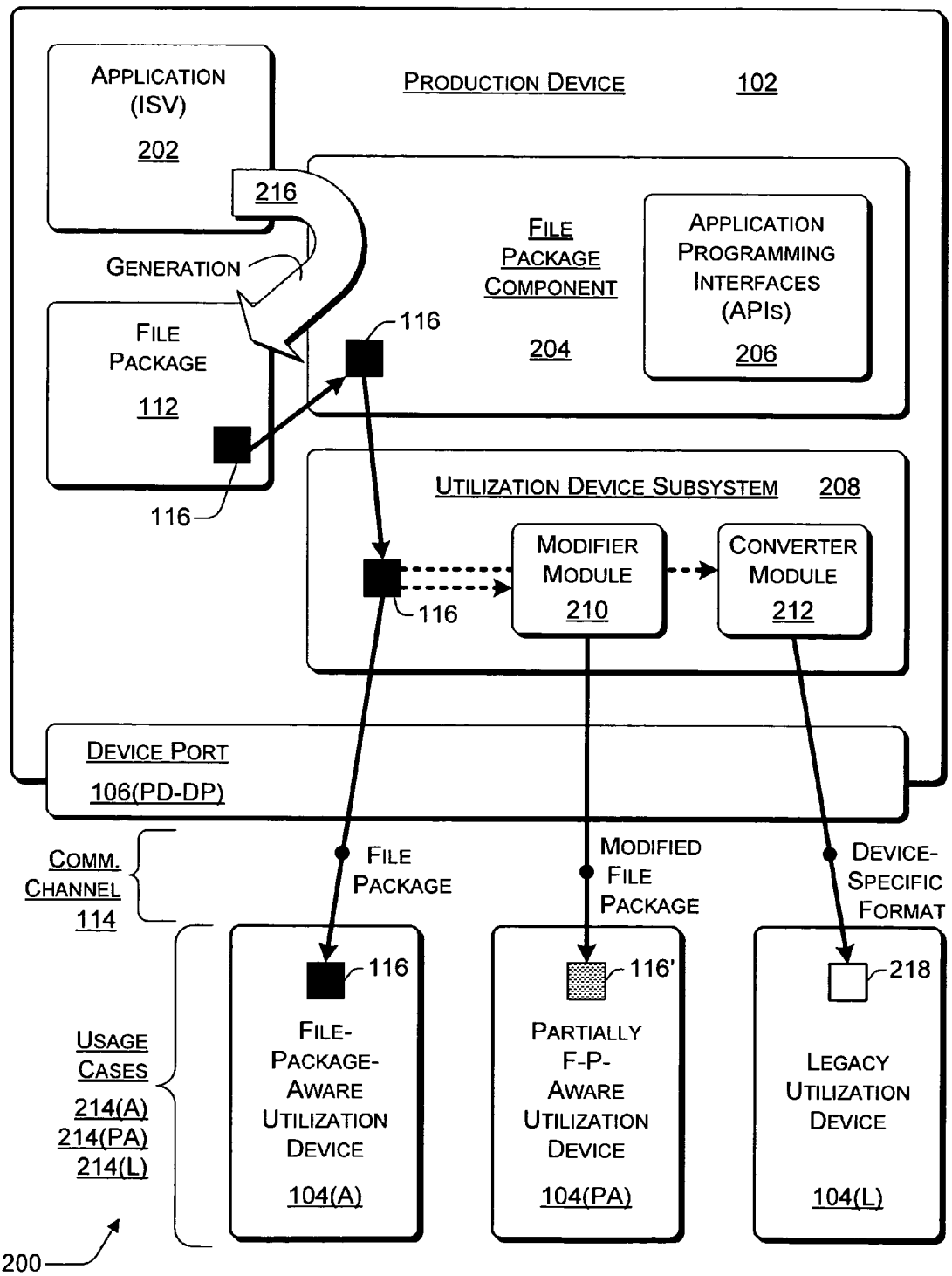
FIG. 2 is an example of a block diagram of the production device providing the file package to utilization devices under different usage cases for different types of utilization devices.

FIG. 2 is an example of a block diagram 200 of production device 102 providing file package 112 to utilization devices 104 under different usage cases 214 for different types of utilization devices 104. Examples of three different usage cases 214 are shown for three different utilization devices 104. These three utilization devices 104 are: a file-package-aware utilization device 104(A), a partially file-package-aware utilization device 104(PA), and a legacy utilization device 104(L). Although three usage cases 214 are illustrated and described, there may alternatively be more or fewer different types of utilization devices 104.

As illustrated, production device 102 includes an application 202, a file package component 204, and a utilization device subsystem 208. Production device 102 also includes a device port 106(PD-DP) implementation of a communication interface 106(PD). By way of utilization device subsystem 208, production device 102 sends file package 112, or at least a version or portion thereof, to utilization devices 104 over communication channel 114 via device port 106(PD-DP).

In a described implementation, application 202 is an application of an independent software vendor (ISV), at least with respect to file package 112, file package component 204, and related features. Consequently, application 202 generates 216 file package 112 using file package component 204. For example, application 202 may make one or more calls to application programming interfaces (APIs) 206 of file package component 204 in order to generate 216 standardized visual representation 116 of file package 112, other information 120 (of FIG. 1), and/or additional parts of file package 112. APIs 206 may alternatively be implemented fully or partially separately from file package component 204, including as part of utilization device subsystem 208. Although not explicitly indicated in FIG. 2, application 202 may access file package 112 after generation 216 thereof.

Standardized visual representation 116 of file package 112 is represented diagrammatically as a back square 116 in block diagram 200. When file package 112 is to be provided to a utilization device 104 (e.g., as requested by application 202 as per a command input by a user), file package component 204 accesses file package 112. In this example, file package component 204 extracts standardized visual representation 116 from file package 112 and forwards standardized visual representation 116 to utilization device subsystem 208. Alternatively, file package component 204 may forward other or additional parts, including all parts or the entirety, of file package 112 to utilization device subsystem 208. The forwarding may also be effectuated directly by application 202 using APIs 206.

Generally, utilization device subsystem 208 is capable of handling file packages 112, or at least standardized visual representations 116. Specifically, utilization device subsystem 208 is adapted to provide at least a portion of file package 112 to a given utilization device 104 in dependence on the corresponding usage case 214(A), 214(PA), or 214(L). To this end, utilization device subsystem 208 includes a modifier module 210 and a converter module 212.

File-package-aware utilization device 104(A) is capable of understanding and handling file package 112 technology. In other words, file-package-aware utilization device 104(A) is capable of consuming or properly digesting file packages 112, or at least standardized visual representations 116. Consequently, utilization device subsystem 208 sends at least standardized visual representation 116 to file-package-aware utilization device 104(A) without changes thereto via device port 106(PD-DP) and across communication channel 114.

However, one or more changes to standardized visual representation 116 are made prior to forwarding it to partially file-package-aware utilization device 104(PA). Partially file-package-aware utilization device 104(PA) is capable of understanding and handling a subset of and/or non-standard file package 112 technology. Specifically, modifier module 210 modifies standardized visual representation 116 to produce a modified standardized visual representation 116'. Modifier module 210 is adapted to rearrange information of file package 112, to remove information to create a backward-compatible version of standardized visual representation 116, some combination thereof, and so forth. This modified standardized visual representation 116' is sent from utilization device subsystem 208 at production device 102 to partially file-package-aware utilization device 104(PA) via device port 106(PD-DP) and across communication channel 114.

On the other hand, some utilization devices 104 can neither understand nor otherwise handle file packages 112, or even standardized visual representations 116 thereof. For example, legacy utilization device 104(L) is incompatible with file package 112. Consequently, utilization device subsystem 208 uses converter module 212 to convert standardized visual representation 116 to a device-specific format representation 218 that is compatible with legacy utilization device 104(L). Device-specific format representation 218 is sent from utilization device subsystem 208 at production device 102 to legacy utilization device 104(L) via device port 106(PD-DP) and across communication channel 114. For this usage case 214(L), legacy utilization device 104(L) is typically unaware that device-specific format representation 218 originated from part of a file package 112.

In these manners, file packages 112 can be effectively utilized directly or indirectly by various utilization devices 104(A,PA,L) of various usage cases 214(A,PA,L). Although not so illustrated in FIG. 2, file package component 204 (including the APIs 206 thereof) may alternatively be implemented as part of application 202 and/or utilization device subsystem 208 (e.g., as part of a driver). Additionally, a file-package-capable viewer or similar application (not separately shown) on production device 102 may utilize file package 112 by presenting to a user a viewable image thereof from standardized visual representation 116, possibly by interfacing with file package component 204 (including by calling the APIs 206 thereof).

Generally, utilization devices 104 may be displaying/viewing devices, archiving devices, distributing devices, printing devices, some combination thereof, and so forth. However, in a described implementation, utilization devices 104 are printing devices. In a printing device 104 implementation, application 202 may be a word processing program, a spreadsheet program, a slide show program, some combination thereof, and so forth. Additionally, utilization device subsystem 208 may be realized as a printing subsystem (e.g., as a printer spooler and/or printer driver), and device port 106(PD-DP) may be realized as a parallel port, a Universal Serial Bus (USB) port, an IEEE 1394 "Firewire" port, or a wireless/wired network interface, and so forth. Accordingly, device-specific format 218 may be realized as a Postscript file, a printer control language (PCL) file, or a rasterized bit map information file, and so forth.

Examples of Downloaded Resource Sharing

Figure 3:
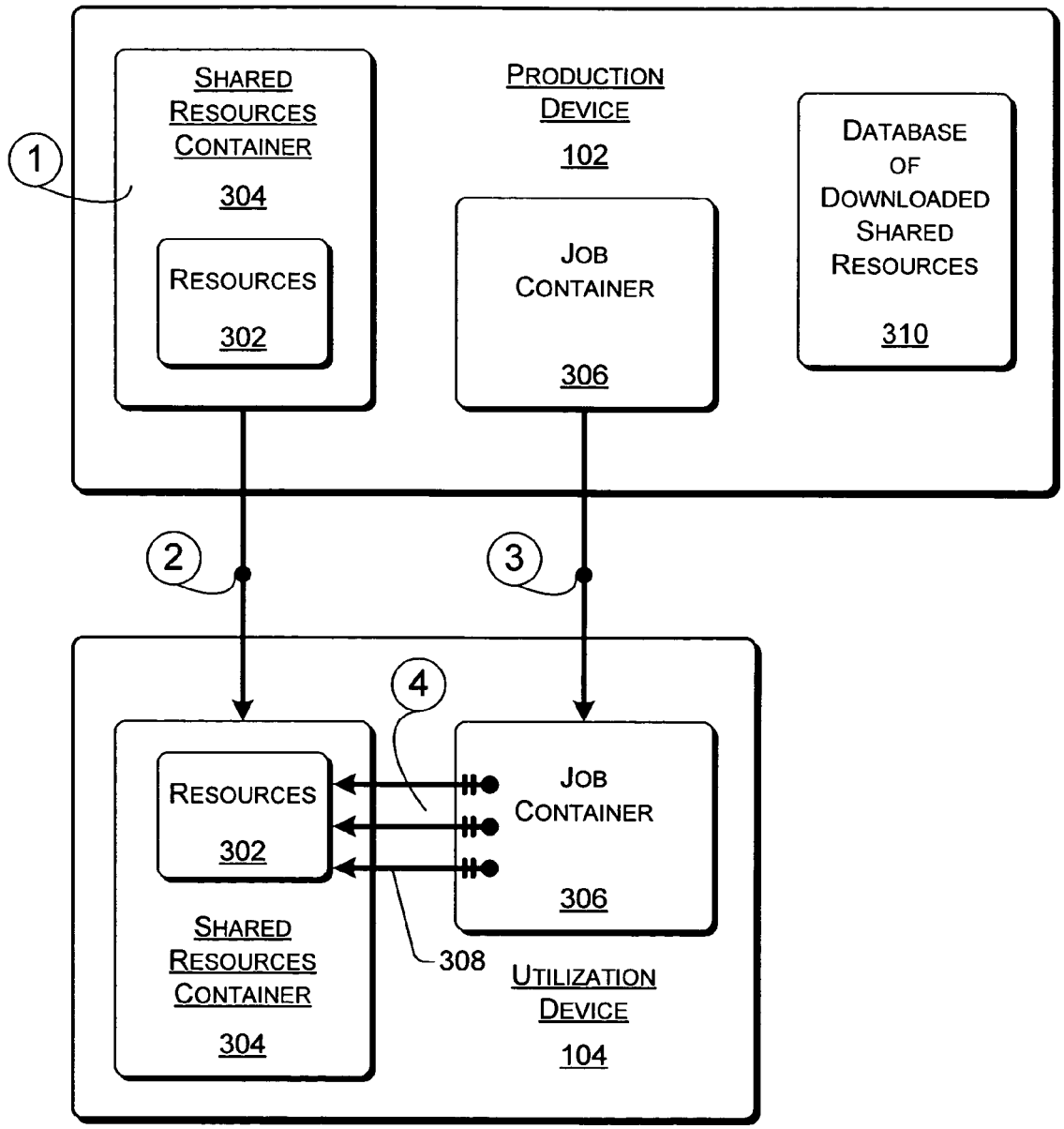
FIG. 3 is an example of an interrelationship between a shared resources container and a job container with respect to an interaction between a production device and a utilization device.

FIG. 3 is an example of an interrelationship between a shared resources container 304 and a job container 306 with respect to an interaction procedure 300 between a production device 102 and a utilization device 104. A database of downloaded shared resources 310 is included at production device 102 and is described further below with reference to FIG. 5. Four phases (1), (2), (3), and (4) of interaction procedure 300 are illustrated. As shown, resources 302 that can be shared are included as part of shared resources container 304.

Shared resources container 304 and job container 306 are two examples of a file package 112. However, all three parts (standardized visual representation 116, private application-specific representation 118, and other information 120) of file package 112 (as shown in FIG. 1) are not necessarily included in shared resources container 304 or job container 306.

In operation of a described implementation, at phase (1), production device 102 collects (shareable) resources 302 and assembles them into shared resources container 304 (e.g., possibly in a manner that is analogous to construction of a library). At phase (2), shared resources container 304 is sent from production device 102 to utilization device 104. For example, production device 102 may transmit shared resources container 304 via communication interface 106 (PD) over communication channel 114 to utilization device 104, which receives shared resources container 304 via communication interface 106(UD).

At phase (3), job container 306 is sent from production device 102 to utilization device 104. For example, production device 102 may transmit job container 306 via communication interface 106(PD) over communication channel 114 to utilization device 104, which receives job container 306 via communication interface 106(UD). Job container 306 serves to request a utilization job from utilization device 104.

In a described implementation, phase (2) precedes phase (3); however, phases (2) and (3) may be effectuated in any order, including partially or fully overlapping. Nevertheless, shared resources container 304 and job container 306 are separate containers or files. In a printing device implementation of utilization device 104, for example, shared resources container 304 and/or job container 306 may be formatted and sent as print jobs (e.g., in accordance with a page description language (PDL) and/or a job control language(JCL)) to a printing device. Examples of JCLs include the printer job language (PJL), the publishing markup language (PML), and so forth. Generally, shared resources container 304 and job container 306 may be formatted at least similarly.

At phase (4), job container 306 is processed by utilization device 104 using resources 302 of shared resources container 304. Specifically, job container 306 references 308 resources 302 of shared resources container 304. In other words, at least one resource that is to be used to process job container 306 at utilization device 104 is referenced 308 by job container 306 to be retrieved from resources 302 of shared resources container 304. For example, a resource 302(*) (not separately indicated in FIG. 3) is retrieved from resources 302 of shared resources container 304 using a reference 308(*) of job container 306.

Examples of resources 302 include images, color tables, backgrounds, clip art, fonts, letterheads, catalog items, company logos, headers/footers, all or a portion of a graphic, a color separation, an entire page for multi-page documents, watermarks, some combination thereof, and so forth. These various types of resources may be treated in a uniform manner with a uniform resource referencing mechanism as described herein. In a described implementation, references 308 comprise uniform resource identifiers (URIs). Resources retrieved from resources 302 of shared resources container 304 using references 308 are used by utilization device 104 when processing job container 306 (e.g., when displaying, archiving, printing, distributing, etc. the document of job container 306).

Although only one shared resources container 304 and one job container 306 are illustrated, multiple such containers 304 and 306 may actually be present within production device 102 and/or utilization device 104. Furthermore, multiple job containers 306 may each reference resources 302 of a single shared resources container 304, and a single job container 306 may reference multiple shared resources containers 304.

In these manners, resources need not be replicated in each container for each job. Additionally, there are specific scenarios, such as variable data printing (VDP), that are especially likely to benefit from the sharing of frequently used resources. An example of VDP is the customization of catalogs for each individual targeted consumer (e.g., based on historical buying patterns and/or demographics). Moreover, the total size of containers sent from production device 102 to utilization device 104 can be reduced by using shared resources container 304.

Figure 4:
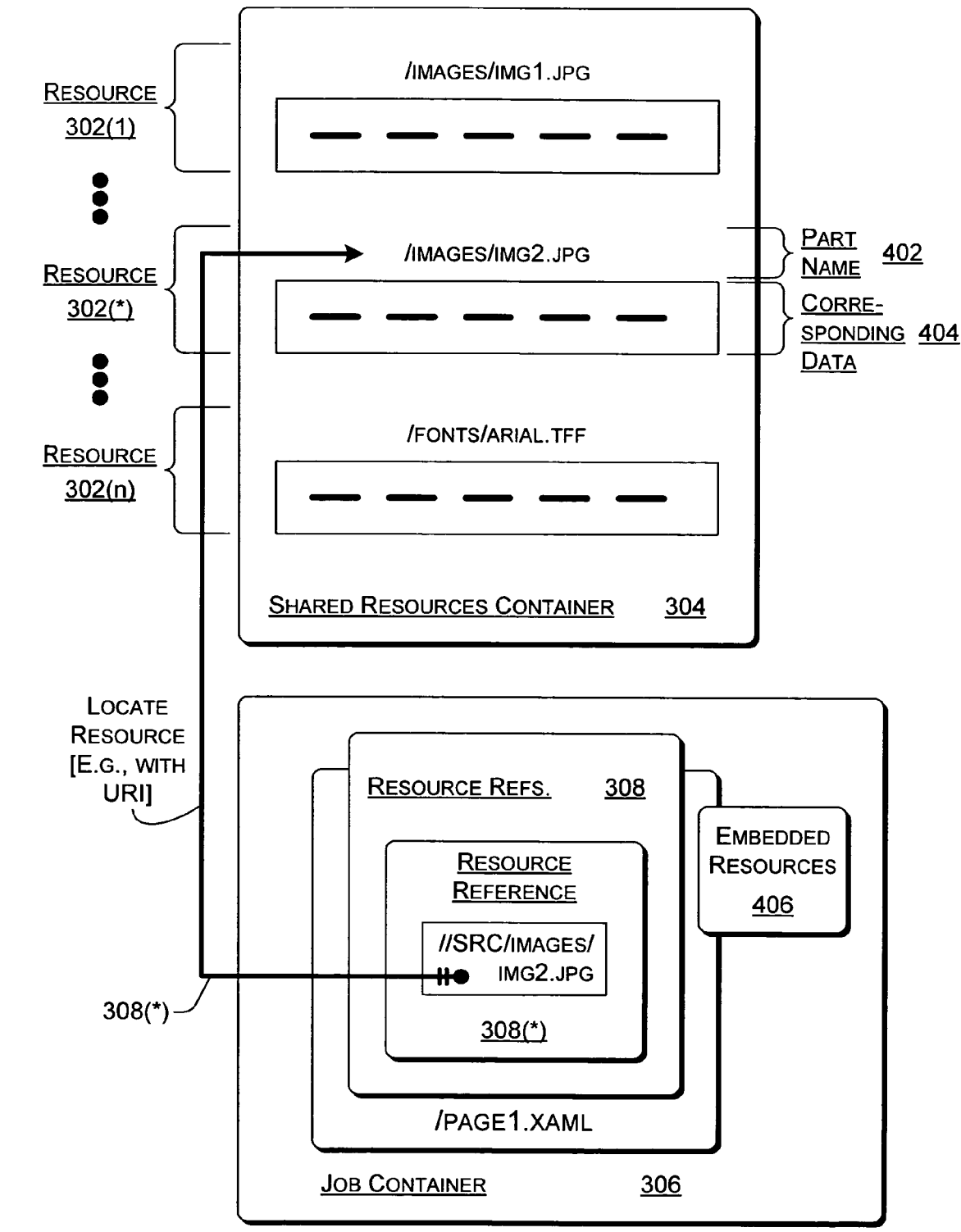
FIG. 4 is a block diagram example of a job container having a resource reference that references a resource in a shared resources container.

FIG. 4 is a block diagram 400 example of a job container 306 having a resource reference 308(*) that references a resource 302(*) in a shared resources container 304. Shared resources container 304 includes multiple resources 302. As illustrated, shared resources container 304 includes resources 302(1) . . . 302(*) . . . 302(n). Each resource 302 includes a part name portion and a corresponding data portion that are individually addressable, as well as optionally a content type.

More specifically, resource 302(*) as illustrated includes part name 402 and corresponding data 404. Each part name 402 may be unique. Resource 302(*), in this example, is an image resource in JPEG format. Part name 402 is "/images/img2jpg", and corresponding data 404 is some JPEG-formatted image corresponding thereto. In a described implementation, each part name 402 comprises a URI. However, part names 402 may be realized in alternative manners.

Job container 306 is a document that is being processed (e.g., by a utilization device 104). As illustrated, job container 306 includes at least one page, which is denoted as "/page1.xaml" in FIG. 4. Each page may be described using a declarative fixed markup language or similar, for example. Job container 306 also usually includes one or more embedded resources 406 (some of which may be for "/page 1.xaml"). Embedded resources 406 are described further herein below with reference to FIG. 5.

Furthermore, job container 306 includes one or more resource references 308, some of which may be for other pages (if present). Resource references 308 may reference resources that are located within (internal to) job container 306 or that are located outside of (external to) job container 306. For example, resource references 308 may reference resources 302 that are part of shared resources container 304. Shared resources container 304 may be located within utilization device 104, at a central server for multiple such utilization devices 104, across a network (e.g., a local area network (LAN), an internet, etc.), some combination thereof, and so forth.

A given resource reference 308(*) refers to resource 302(*) of shared resources container 304. As illustrated, resource reference 308(*) identifies a resource by including a pointer "//SRC/images/img2.jpg", where 'SRC' refers to a particular shared resources container 304. Resource reference 308(*) is associated with and points to resource 302(*). Furthermore, resource reference 308(*) enables a related resource 302(*) to be located and retrieved for use in the processing of job container 306. In a described implementation, resource reference 308(*) also comprises a URI.

In operation, a production device 102 formulates or prepares job container 306 with knowledge of an existing shared resources container 304 (if any) and with consideration as to whether any resources should be added to resources 302 of an existing shared resources container 304 (or, alternatively, whether a new shared resources container 304 should be created). If a desired resource is to be retrieved from a shared resources container 304, production device 102 inserts into job container 306 a resource reference 308 pointing to the associated resource 302 of shared resources container 304 instead of embedding the actual resource. During processing of a job container 306 by a utilization device 104, relevant resources are retrieved from external locations using inserted resource references 308, including possibly from resources 302 of shared resources container 304.

This described resource location and retrieval mechanism is independent of resource type. Resources are identified (e.g., with URIs) independently of resource type. For example, resources, regardless of type, that are used for the processing of job container 306 may be referred to by URI within job container 306. Thus, the URI may point outside of job container 306. This pointing may be to a shared resources container 304, as illustrated in FIG. 4. Alternatively, the pointing may be to an external device (not shown) such as a directly-connected storage device, a network server that is accessible over a network (e.g., a LAN, an internet, etc.), and so forth.

Examples of Methods for Downloaded Resource Sharing

Figure 5:
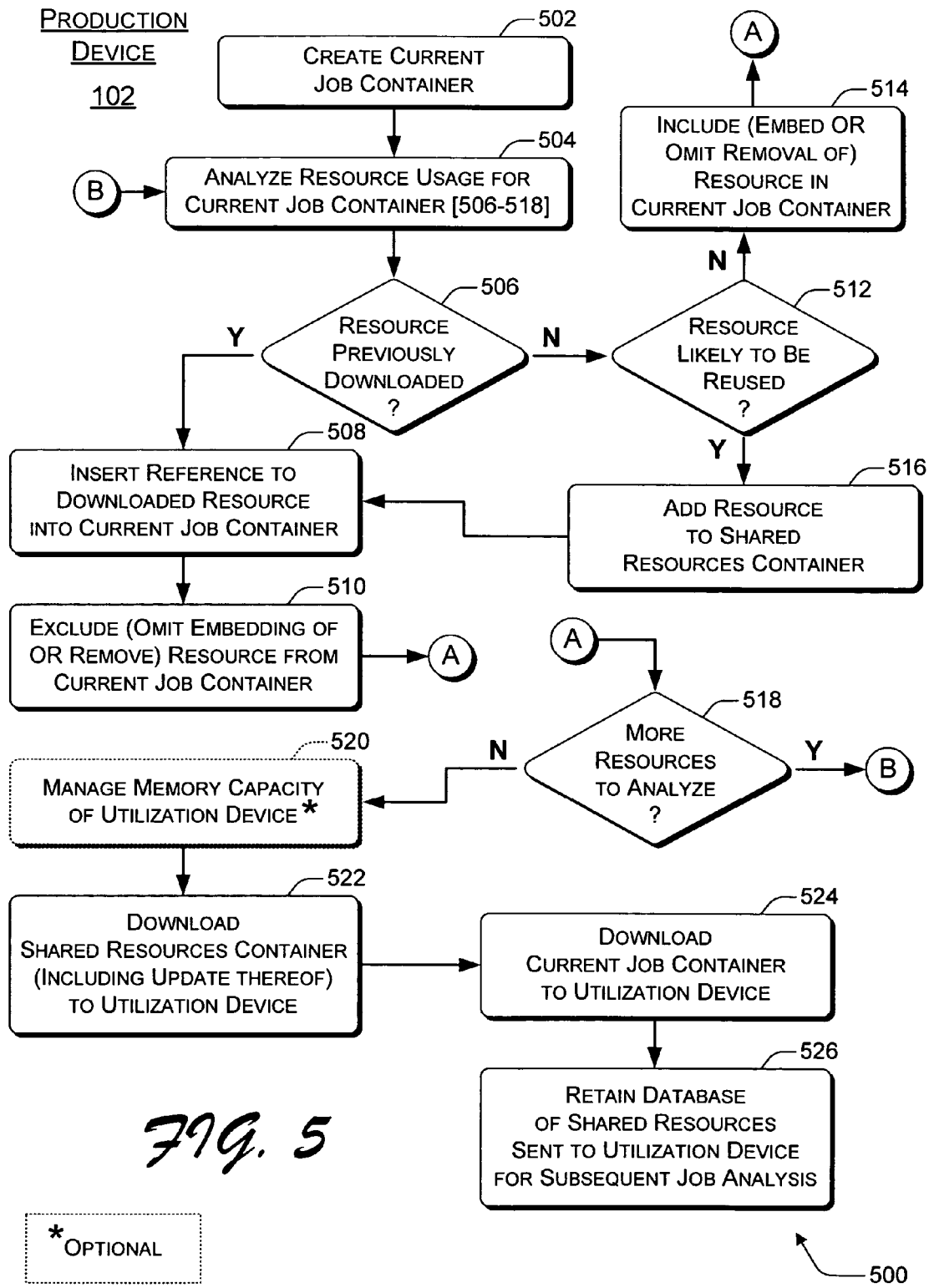
FIG. 5 is a flow diagram that illustrates an example of a method for managing resources in conjunction with a shared resources container when processing a job container at a production device.

FIG. 5 is a flow diagram 500 that illustrates an example of a method for managing resources in conjunction with a shared resources container when processing a job container at a production device. Flow diagram 500 includes thirteen (13) blocks 502-526. Although the actions of flow diagram 500 may be performed in other environments and with a variety of hardware and software implementations, FIGS. 1-4 are used in particular to illustrate certain aspects and examples of the method. For example, a production device 102 may perform the actions of blocks 502-526 while interacting with a utilization device 104.

At block 502, a current job container is created. For example, an application 202 may create a file package 112 and then request that file package component 204 send file package 112, or at least standardized visual representation 116 thereof, to a utilization device 104, thus establishing a request for a job container 306. The actions of flow diagram 500 may be performed fully or partially by file package component 204 and/or utilization device subsystem 208; nevertheless, the actions are described below in the context of only file package component 204 for the sake of clarity.

At block 504, the resource usage for the current job container is analyzed. For example, file package component 204 may analyze the resource usage of job container 306. (Alternatively, utilization device subsystem 208 alone or in cooperation with file package component 204 may analyze the resource usage of job container 306.) The resources to be utilized by job container 306 are analyzed to determine an interrelationship between job container 306 and shared resources container 304. The actions of blocks 506-518 are a detailed example of such a resource analysis process. In blocks 506-518, resources of the current job container are considered individually and sequentially; however, the resources may alternatively be analyzed simultaneously.

At block 506, it is ascertained if a particular resource has been previously downloaded so as to be accessible by the utilization device. For example, it may be ascertained if a resource 302(*) has been previously downloaded in a shared resources container 304 so as to be accessible by utilization device 104 by comparing resource 302(*) to those resources listed in database of downloaded shared resources 310 to see if it is recognized. If "Yes" the particular resource has been previously downloaded (as ascertained at block 506), then at block 508 a reference to the downloaded resource is inserted into the current job document. For example, a resource reference 308(*), which points to resource 302(*) in shared resources container 304, is inserted into job container 306.

At block 510, the particular resource is excluded from the current job container; the exclusion may be effectuated by omitting any embedding thereof (if not already present in the job container) or by removing the resource (if already present in the job container). For example, embedding of an embedded resource 406 into job container 306 may be omitted, or such an embedded resource 406 may be removed from job container 306. An internal reference to such an embedded resource 406, if the internal reference is already present in a page of job container 306, is also removed from job container 306.

At block 518, it is checked whether there are more resources in the current job container to analyze. For example, it may be checked whether there are any additional resources (e.g., already or previously embedded resources 406) in job container 306 that have yet to be analyzed. If "No", then the method continues at block 520, which is described further herein below. If "Yes", on the other hand, there are additional resources in the current job container to analyze (as checked at block 518), then the method continues again at block 504.

In this iteration of analyzing resource usage for the current job container (starting at block 504), it is ascertained at block 506 that "No" the particular resource under consideration has not been previously downloaded. At block 512, it is determined if the particular resource is likely to be reused. For example, it may be determined if a resource is likely to be used again in a subsequent job container 306'. For instance, file package component 204 may determine on a heuristic basis, using predetermined algorithms, through end-user intent as specified by parameters that are stipulated by user input(s), or using some other suitable mechanism which resources are likely to be used again and are thus candidates to be shared.

If "Yes" the particular resource is determined (at block 512) to be likely to be reused, then at block 516 the particular resource is added to the shared resources container. For example, resource 302(*) may be added to shared resources container 304. This may be accomplished by amending a current shared resources container 304 or by creating a new shared resources container 304, as is described further herein below with reference to block 522. Thereafter, the method continues at blocks 508 and 510 (as described above) in order to insert into the current job container a reference to the particular resource, which is downloaded via a shared resources container mechanism, and to exclude the particular resource from the current job container.

If, on the other hand, it is determined (at block 512) that "No" the particular resource is not likely to be reused, then at block 514 the particular resource is included in the current job container; the inclusion may be effectuated by embedding the resource (if not already present in the job container) or by omitting any removal thereof (if already present in the job container). For example, the actual resource may be embedded into job container 306 as an embedded resource 406, or such an already embedded resource 406 may be left in job container 306. An internal reference to such an embedded resource 406, if the internal reference is already present in a page of job container 306, is also left in job container 306. After including the particular resource, the method of flow diagram 500 continues at block 518 (as described above) by checking whether there are any additional resources to analyze.

At block 520, the memory capacity of the utilization device is managed. For example, the capacity of a memory portion of media 110(UD) of utilization device 104 may be managed by production device 102. For instance, if file package component 204 detects that utilization device 104 has insufficient available memory to store additional shared resources 302, file package component 204 instructs utilization device 104 (e.g., through some suitable job control mechanism) to discard specifically enumerated previously-downloaded (e.g., older) shared resources 302. Selection of the specific older shared resources 302 may be made with a least recently used (LRU) or other algorithm. Although many of the actions of the method of flow diagram 500 are optional, the action(s) of block 520 are particularly optional inasmuch as these action(s) depend on the usable memory capacity of the relevant utilization device, which may not typically be exhausted.

At block 522, the shared resources container (including updates thereof) is downloaded to the utilization device. For example, production device 102 may download shared resources container 304 to utilization device 104 using an appropriate job control mechanism to instruct utilization device 104 to retain shared resources container 304 without immediately utilizing it as a separate job. The downloaded shared resources container 304 (i) may then exist alongside previously (and any subsequently) downloaded shared resources containers or (ii) may then be combined with an already existing amalgamated shared resources container as an amendment thereto and update thereof.

At block 524, the current job container is downloaded to the utilization device. For example, production device 102 may download job container 306 to utilization device 104. At block 526, a database of shared resources that have been sent to the utilization device is retained for use in resource analyses of subsequent utilization jobs. For example, database of downloaded shared resources 310 includes a listing of resources 302 that have been sent (e.g., at block 522) to utilization device 104. Database of downloaded shared resources 310 is retained at production device 102 for resource use analysis of subsequent job containers in the action(s) of block 506.

Figure 6:
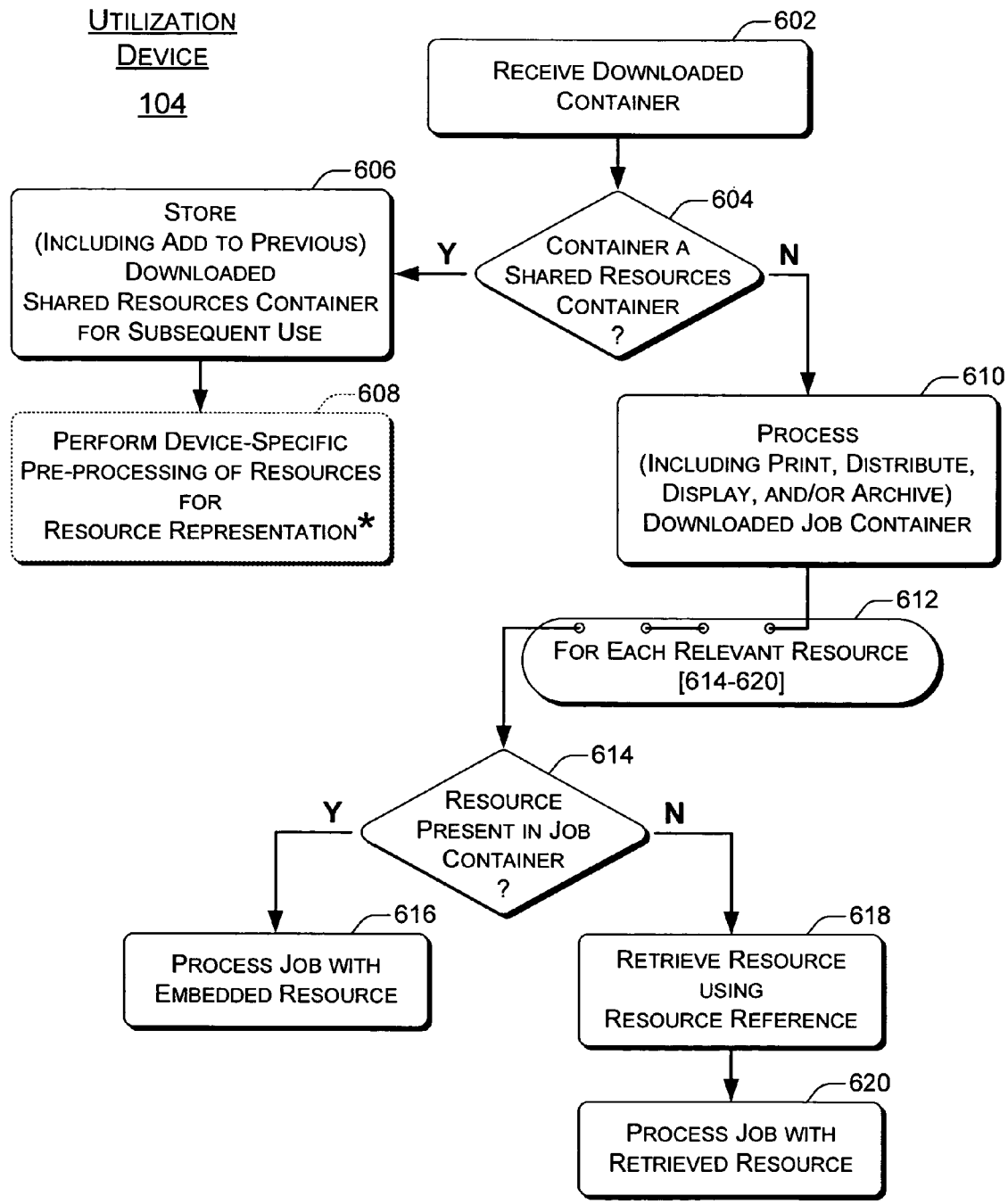
FIG. 6 is a flow diagram that illustrates an example of a method for processing at a utilization device a container that may be a shared resources container or a job container.

FIG. 6 is a flow diagram 600 that illustrates an example of a method for processing at a utilization device a container that may be a shared resources container or a job container. Flow diagram 600 includes ten (10) blocks 602-620. Although the actions of flow diagram 600 may be performed in other environments and with a variety of hardware and software implementations, FIGS. 1-4 are used in particular to illustrate certain aspects and examples of the method. For example, a utilization device 104 may perform the actions of blocks 602-620 while interacting with a production device 102.

At block 602, a downloaded container is received. For example, utilization device 104 may receive a downloaded container (e.g., a shared resources container 304 or a job container 306) from production device 102. At block 604, it is determined if the downloaded container is a shared resources container. For example, a shared resources container 304 may be differentiated from a job container 306 with additional job control information (e.g., a shared resources indicator) that is provided to utilization device 104 from production device 102.

If "Yes", the received container is determined to be a shared resources container (at block 604), then at block 606 the downloaded shared resources container is stored for subsequent use. For example, a downloaded shared resources container 304 may be stored by utilization device 104 at media 110(UD) for use in processing subsequently-received job containers 306. Media 110(UD) may be RAM, a mass storage device, some combination thereof, and so forth. This storing may entail storing a first shared resources container 304, storing an additional shared resources container 304 along with other previously-received shared resources containers 304, or adding the resources of a just-received shared resources container 304 to a preexisting, amalgamated shared resources container 304.

At block 608, device-specific pre-processing of resources is performed for resource representation. For example, a resource may be pre-rendered prior to actual use or even prior to arrival of a job container 306 that requests the resource in order to save time during the processing of job containers 306. For instance, utilization device 104 may perform device-specific optimizations of resource representations and store them in a manner that facilitates rapid retrieval. Although many of the actions of the method of flow diagram 600 are optional, the action(s) of block 608 are particularly optional inasmuch as these action(s) may be performed only when convenient and/or when storage requirements for a given post-processed resource impact a utilization device 104 less than repeated processing of the given resource upon request.

If "No", on the other hand, the received container is not determined to be a shared resources container (at block 604), then at block 610 the downloaded job container is processed (e.g., printed, distributed, displayed, and/or archived). For example, utilization device 104, such as a printing device, may begin to process downloaded job container 306, which may be a print job.

At block 612, it is indicated that the actions of blocks 614-620 are repeated for each relevant resource. For example, for each resource to be used when processing job container 306, the actions of blocks 614-620 are repeated by utilization device 104. These actions may also be performed fully or partially in parallel for each of the different resources.

At block 614, it is ascertained if a particular resource is present in the downloaded job container. For example, utilization device 104 may ascertain if a particular resource is represented in job container 306 as an actual, embedded resource 406 or if a resource reference 308 is present instead.

If "Yes" the particular resource is ascertained (at block 614) to be present in the job container, then at block 616 the utilization job is processed using the embedded resource. For example, utilization device 104 may use embedded resource 406 when processing job container 306.

If "No", on the other hand, the particular resource is not ascertained (at block 614) to be present in the job container, then at block 618 a resource is retrieved using a resource reference of the downloaded job container. For example, a resource 302(*) may be retrieved from shared resources container 304 using a resource reference 308(*) extracted from job container 306. A pre-processed version of the resource is retrieved if available. At block 620, the utilization job is then processed using the retrieved resource. For example, utilization device 104 may process job container 306 using resource 302(*) as retrieved from shared resources container 304.

The implementations described above with reference to FIGS. 5 and 6 relate to downloading shared resources 302 in a shared resources container 304 primarily separately from job containers 306. However, in an alternative implementation, shared resources 302 are downloaded from a production device 102 to a utilization device 104 along with job-specific resources 302 (e.g., embedded resources 406) in job containers 306. These shared resources 302 are marked or otherwise identified within job containers 306 as being shared resources 302 that should be retained for possible future use (e.g., in a shared resources container 304 that is stored at utilization device 104).

For example, a shared resources container 304 may exist in utilization device 104 but not necessarily in production device 102. In such an implementation, job container 306 includes resources 302 that are discovered by production device 102 to be shareable in the resource usage analysis of FIG. 5. Hence, these resources are not stripped from job container 306 by production device 102; instead, utilization device 104 adds them to shared resources container 304 after receiving them in job container 306.

To this effect, production device 102 assigns a unique name to each shared resource 302 (e.g., using a globally unique identifier (GUID)) and includes it in job container 306. For example, although each resource may still be named with a URI, part of the URI may be constructed using a GUID in order to avoid resource name conflicts with resources already stored in a device. Production device 102 may optionally keep a copy of a shared resources container 304 along with the identifying GUIDs for later reference in a resource usage analysis for a subsequent job container 306. This is not a requirement, however, as long as production device 102 can identify recurring resources and match them to the previously-assigned GUIDs.

For this alternative implementation, an example job container 306 may include the following example parts:

```
Job Container:
    /SHARED_RES/Unique1.jpg
    /SHARED_RES/Unique2.jpg
    /Non_Shared_res/image.jpg
    /pages/page1.xaml:
        references
            /Non_Shared_res/image.jpg,
            //SRC/SHARED_RES/Unique1.jpg,
            //SRC/SHARED_RES/Unique2.jpg
```

When a utilization device 104 receives such an example job container 306, it strips resources 302 from the shared resources section (e.g., /SHARED_RES/) and adds them to a shared resources container 304 (e.g., //SRC/SHARED_RES/). Job container 306 can then be processed as described above with reference to FIG. 6. More specifically, with reference to flowchart 600, actions analogous to those of blocks 606 and 608 are performed for each job container 306 that includes shared resources by the stripping or extraction thereof. The remainder of job container 306 may then be processed with actions similar to those of blocks 610 and 612 (which includes blocks 614-620). A utilization device 104 may alternatively process the entirety of job container 306 and then extract and retain those resources 302 that are indicated as being shareable for subsequent job containers 306.

Continuing with the example for this alternative implementation, an example subsequent job container 306 (having the same page content for the sake of clarity) may include the following example parts:

```
Subsequent Job Container:
    /Non_Shared_res/image.jpg
```

```
-continued

/pages/page1.xaml:
    references
        /Non__Shared__res/image.jpg,
        //SRC/SHARED_RES/Unique1.jpg,
        //SRC/SHARED_RES/Unique2.jpg
```

When a utilization device 104 receives such an example subsequent job container 306, utilization device 104 can access a shared resources container 304 and extract therefrom any relevant shared resources 302. Specifically, both //SRC/SHARED_RES/Unique1.jpg and //SRC/SHARED_RES/unique2.jpg reference resources 302 that were previously contained in another job container 306. As described above, they were moved to, and are now located at, shared resources container 304.

In this alternative implementation but with reference to block 516 of flowchart 500 of FIG. 5, a production device 102 instead includes the shareable resource 302 in the current job container 306 with a shareable identification such as a GUID. The action(s) of block 522 may be omitted because the shared resources 302 are included in the current job container 306 that is downloaded at block 524.

The devices, actions, aspects, features, procedures, components, etc. of FIGS. 1-6 are illustrated in diagrams that are divided into multiple blocks. However, the order, interconnections, interrelationships, layout, etc. in which FIGS. 1-6 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for the sharing of downloaded resources. Furthermore, although the description herein includes references to specific implementations (including the general device of FIG. 7 below), the illustrated and/or described implementations can be implemented in any suitable hardware, software, firmware, or combination thereof and using any suitable device architecture(s), referencing element(s), resource data structure organization(s), communication protocol(s), content representation format(s), and so forth.

Example Operating Environment for Computer or Other Device

Figure 7:
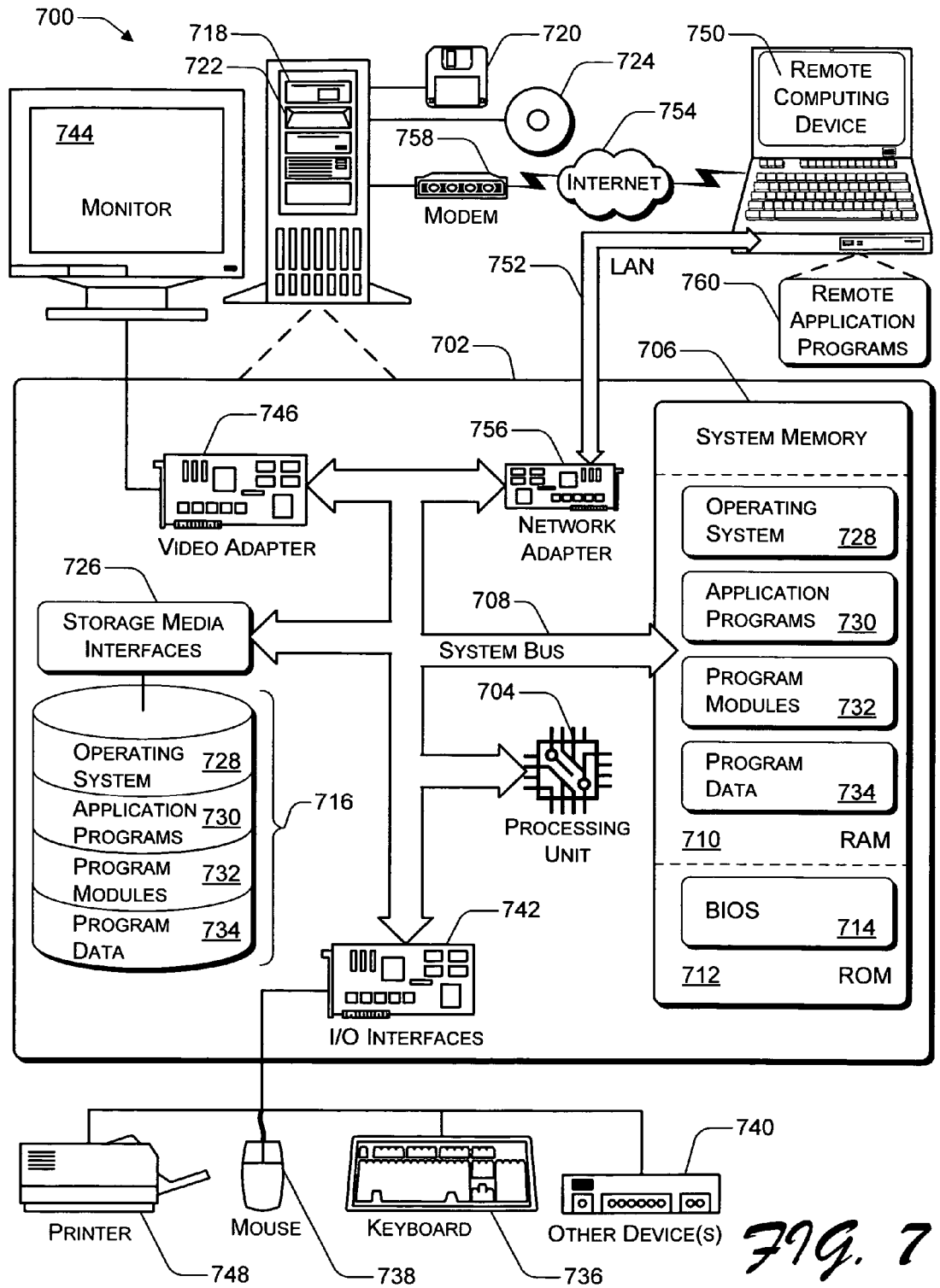
FIG. 7 illustrates an example of a computing (or general device) operating environment that is capable of (wholly or partially) implementing at least one aspect of the sharing of downloaded resources as described herein.

FIG. 7 illustrates an example computing (or general device) operating environment 700 that is capable of (fully or partially) implementing at least one system, device, apparatus, component, arrangement, protocol, approach, method, procedure, media, API, some combination thereof, etc. for downloaded resource sharing as described herein. Operating environment 700 may be utilized in the computer and network architectures described below.

Example operating environment 700 is only one example of an environment and is not intended to suggest any limitation as to the scope of use or functionality of the applicable device (including computer, network node, entertainment device, mobile appliance, general electronic device, etc.) architectures. Neither should operating environment 700 (or the devices thereof) be interpreted as having any dependency or requirement relating to any one or to any combination of components as illustrated in FIG. 7.

Additionally, the sharing of downloaded resources may be implemented with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, network nodes, computer and/or electronic peripherals, distributed or multi-processing computing environments that include any of the above systems or devices, some combination thereof, and so forth.

Implementations for the sharing of downloaded resources may be described in the general context of processor-executable instructions. Generally, processor-executable instructions include routines, programs, protocols, objects, interfaces, components, data structures, etc. that perform and/or enable particular tasks and/or implement particular abstract data types. Downloaded resource sharing, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Exemplary operating environment 700 includes a general-purpose computing device in the form of a computer 702, which may comprise any (e.g., electronic) device with computing/processing capabilities. The components of computer 702 may include, but are not limited to, one or more processors or processing units 704, a system memory 706, and a system bus 708 that couples various system components including processor 704 to system memory 706.

Processors 704 are not limited by the materials from which they are formed or the processing mechanisms employed therein. For example, processors 704 may be comprised of semiconductor(s) and/or transistors (e.g., electronic integrated circuits (ICs)). In such a context, processor-executable instructions may be electronically-executable instructions. Alternatively, the mechanisms of or for processors 704, and thus of or for computer 702, may include, but are not limited to, quantum computing, optical computing, mechanical computing (e.g., using nanotechnology), and so forth.

System bus 708 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of processor-accessible media. Such media may be any available media that is accessible by computer 702 or another (e.g., electronic) device, and it includes both volatile and non-volatile media, removable and non-removable media, and storage and transmission media.

System memory 706 includes processor-accessible storage media in the form of volatile memory, such as random access memory (RAM) 740, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD, DVD, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated processor-accessible media provide non-volatile storage of processor-executable instructions, such as data structures, program modules, and other data for computer 702. Although exemplary computer 702 illustrates a hard disk 716, a removable magnetic disk 720, and a removable optical disk 724, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hardwired IC chips. In other words, any processor-accessible media may be utilized to realize the storage media of the exemplary operating environment 700.

Any number of program modules (or other units or sets of instructions/code) may be stored on hard disk 716, magnetic disk 720, optical disk 724, ROM 712, and/or RAM 740, including by way of general example, an operating system 728, one or more application programs 730, other program modules 732, and program data 734.

A user may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, scanner, and/or the like. These and other input devices are connected to processing unit 704 via input/output interfaces 742 that are coupled to system bus 708. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 744 or other type of display device may also be connected to system bus 708 via an interface, such as a video adapter 746. Video adapter 746 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a peripheral device, a personal computer, a portable computer (e.g., laptop computer, tablet computer, PDA, mobile station, etc.), a palm or pocket-sized computer, a watch, a gaming device, a server, a router, a network computer, a peripheral device, a peer device, another network node, or another device type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 702 is usually connected to LAN 752 via a network interface or adapter 756. When implemented in a WAN networking environment, computer 702 typically includes a modem 758 or other component for establishing communications over WAN 754. Modem 758, which may be internal or external to computer 702, may be connected to system bus 708 via input/output interfaces 742 or any other appropriate mechanism(s). It is to be appreciated that the illustrated network connections are exemplary and that other manners for establishing communication link(s) between computers 702 and 750 may be employed.

In a networked environment, such as that illustrated with operating environment 700, program modules or other instructions that are depicted relative to computer 702, or portions thereof, may be fully or partially stored in a remote media storage device. By way of example, remote application programs 760 reside on a memory component of remote computer 750 but may be usable or otherwise accessible via computer 702. Also, for purposes of illustration, application programs 730 and other processor-executable instructions such as operating system 728 are illustrated herein as discrete blocks, but it is recognized that such programs, components, and other instructions reside at various times in different storage components of computing device 702 (and/or remote computing device 750) and are executed by processor(s) 704 of computer 702 (and/or those of remote computing device 750).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. One or more storage media comprising processor-executable instructions that, when executed, cause one or more processors to perform actions comprising:

Ascertaining current resources for a current job container of a current job has been previously downloaded into a shared resources container at a production device;

if the current resources for the current job container has been previously downloaded into the shared resources container, inserting a plurality of resource references into the current job container, each resource reference pointing to one corresponding resource previously downloaded into the shared resources container;

If at least one of the current resources for the current job container has not been previously downloaded into the shared resources container, determining if the at least one current resource is to be reused in a subsequent job container based on at least one user-stipulated input, and embed the at least one current resource in the current job container if the at least one current resource is not to be reused in a subsequent job container;

downloading the shared resources container that includes previously downloaded resources for a plurality of jobs from the production device to a utilization device, the utilization device including one or more of a resource displaying device, a resource archiving device, a resource distribution device, or a resource printing device, the plurality of jobs including the current job;

downloading the current job container from the production device to the utilization device; and if the current job container includes resource references to the previously downloaded resources included in the shared resources container, processing the current job container at the utilization device using at least the shared resources container, If the current job container does not include resource references to the previously downloaded resources included in the shared resources container, processing current job container at the utilization device using one or more embedded resources included in the current job container, wherein the processing includes at least one of printing, distributing, displaying, or archiving the current job container, and the one or more embedded resources include one or more of an image, a color table, a background, a clip art, a font, a letterhead, a catalog item, a company logo, a header, a footer, at least a portion of a graphic, a color separation, a document page, or a watermark.

2. The one or more storage media as recited in claim 1, wherein the resource reference comprises a uniform resource identifier (URI).

3. The one or more storage media as recited in claim 1, wherein the processor-executable instructions, when executed, direct the one or more processors to perform a further action comprising:

excluding the current resources from the current job container if the current resources have been previously downloaded into the shared resources container.

4. The one or more storage media as recited in claim 3, wherein the action of excluding comprises at least one action selected from the group comprising:

omitting an embedding of the current resources into the current job container; and removing the current resources from the current job container, wherein the omitting and removing occurs if the current resources have been previously downloaded into the shared resources container.

5. The one or more storage media as recited in claim 1, wherein the processor-executable instructions, when executed, direct the one or more processors to perform further actions comprising:

checking if the current job container has additional resources to be analyzed; and if the current job container does have additional resources to be analyzed, repeating the action of ascertaining with another resource for the current job container.

6. The one or more storage media as recited in claim 1, wherein the processor-executable instructions, when executed, direct the one or more processors to perform further actions comprising:

checking if the current job container has additional resources to be analyzed; and if the current job container does not have additional resources to be analyzed, managing a memory capacity of a utilization device by instructing the utilization device to discard at least one resource previously downloaded as part of a previous shared resources container.

7. The one or more storage media as recited in claim 1, wherein the action of inserting the plurality of resource references into the current job container includes inserting a resource reference that points to a corresponding resource in a manner that is independent of resource type.

8. The one or more storage media as recited in claim 7, wherein the action of downloading includes an action of:

downloading an updated shared resources container using a job control mechanism including a shared resources indicator that instructs the utilization device to retain the contents of the updated shared resource container.

9. The one or more storage media as recited in claim 1, wherein the processor-executable instructions, when executed, direct the device to perform a further action comprising:

retaining a database of shared resources, which have been sent to the utilization device, for resource usage analysis with subsequent job containers.

10. The one or more storage media as recited in claim 1, wherein the processor-executable instructions, when executed, direct the one or more processors to perform further actions comprising:

ascertaining if another current resource for the current job container has been previously downloaded in the shared resources container; and if the another current resource for the current job container has not been previously downloaded, determining if the another current resource is to be reused in a subsequent job container based on at least one user-stipulated input.

11. The one or more storage media as recited in claim 10, wherein the processor-executable instructions, when executed, direct the one or more processors to perform a further action comprising:

if the another current resource is determined to be to be reused, adding the another current resource to the shared resources container.

12. The one or more storage media as recited in claim 10, wherein the processor-executable instructions, when executed, direct the one or more processor to perform a further action comprising:

if the another current resource downloaded into the shared resources container is determined to be to be reused, marking the another current resource as a shareable resource.

13. The one or more storage media as recited in claim 11, wherein the processor-executable instructions, when executed, direct the one or more processors to perform a further action comprising:
   inserting another resource reference into the current job container, the another resource reference pointing to the another current resource added to the shared resources container.

14. The one or more storage media as recited in claim 10, wherein the processor-executable instructions, when executed, direct the one or more processors to perform a further action comprising:
   if the another current resource is not determined to be to be reused, including the another current resource in the current job container.

15. The one or more storage media as recited in claim 14, wherein the action of including comprises at least one action selected from a group comprising:
   embedding the another current resource into the current job container; and
   omitting removal of the another current resource from the current job container, wherein the omitting and removing occurs if the another resource has been previously downloaded into the shared resources container.

16. The one or more storage media as recited in claim 1, wherein at least a portion of the processor-executable instructions comprise at least part of a printer driver program.

17. One or more storage media comprising processor-executable instructions that, when executed, direct a utilization device to perform actions comprising:
   determining if at least one resource is to be reused in a subsequent job container based on at least one user-stipulated input, and embed the at least one resource in a current job container if the at least one resource is not to be reused in a subsequent job container;
   receiving a downloaded container at the utilization device, the downloaded container comprises a shared resources container or the current job container, the utilization device including one or more of a resource displaying device, a resource archiving device, a resource distribution device, or a resource printing device;
   determining if the downloaded container comprises a shared resources container or the current job container based on job control information; and
   if the downloaded container comprises the shared resources container, storing the shared resources container in the utilization device for subsequent use;
   if the downloaded container comprises the current job container, processing the current job container using (1) the at least one resource embedded in the current job container, and (2) one or more resources referenced in the current job container, the one or more resources being included in a shared resources container that is stored in the utilization device and not embedded in the current job container,
   wherein the at least one resource embedded in the current job container includes one or more of an image, a color table, a background, a clip art, a font, a letterhead, a catalog item, a company logo, a header, a footer, at least a portion of a graphic, a color separation, a document page, or a watermark.

18. The one or more storage media as recited in claim 17, wherein the action of the determining if the downloaded container comprises a shared resources container includes an action of:
   Reviewing additional job control information included in and/or accompanying the downloaded container to determine if the downloaded container comprises the shared resources container.

19. The one or more storage media as recited in claim 18, wherein the action of reviewing includes an action of:
   inspecting the additional job control information to detect if a shared resources indicator is included as at least a part thereof.

20. The one or more storage media as recited in claim 17, wherein the processor-executable instructions, when executed, direct the device to perform further actions comprising:
   storing an initial shared resources container;
   storing an additional shared resources container along with at least one other previously-received shared resources container; and
   adding resources of the additional shared resources container to those of the stored shared resources container.

21. The one or more storage media as recited in claim 17, wherein the processor-executable instructions, when executed, direct the device to perform a further action comprising:
   if the downloaded container is determined to comprise a shared resources container, performing device-specific pre-processing of at least a portion of resources included in the shared resources container to facilitate resource representation.

22. The one or more storage media as recited in claim 17, wherein the action of processing the current job container includes at least one of displaying, printing, distributing, or archiving the at least one resource embedded in the current job container or the one or more resources included in the shared resources container and not embedded in the current job container.

23. The one or more storage media as recited in claim 17, wherein the action of processing the current job container includes ascertaining if the at least one resource is embedded in the current job container.

24. The one or more storage media as recited in claim 23, wherein each of (1) the at least one resource embedded in the current job container and (2) the one or more resources referenced in the current job container and included in the shared resources container comprises:
   one or more of images, color tables, backgrounds, clip art, fonts, letterheads, catalog items, company logos, headers/footers, all or a portion of a graphic, a color separation, an entire page for multi-page documents, watermarks, or a combination thereof.

25. The one or more storage media as recited in claim 23, wherein the action of processing the current job container includes retrieving a resource from the shared resources container using a resource reference included in the current job container and processing the current job container with the retrieved resource.

26. The one or more storage media as recited in claim 25, wherein the action of retrieving includes an action of:
   retrieving the resource from the shared resources container, the shared resources container stored by at least one of the device, a network server, or a storage device.

27. A production device comprising:
   a shared resources container including a particular resource of a plurality of resources, the plurality of resources being not embedded in any job container; and
   a job container including (1) a particular resource reference that points to the particular resource of the shared resources container and (2) one or more embedded resources that are not reused in a subsequent job container, the one or more embedded resources comprise one or more of an image, a color table, a background, a clip art, a font, a letterhead, a catalog item, a company logo, a header, a footer, at least a portion of a graphic, a color separation, a document page, or a watermark;

wherein the particular resource reference of the job container points to the particular resource of the shared resources container in a manner independent of resource type, and wherein the shared resources container and the job container are downloadable from the production device to an utilization device.

28. The production device as recited in claim 27, wherein the plurality of resources comprise one or more of images, color tables, backgrounds, clip art, fonts, letterheads, catalog items, company Logos, headers/footers, all or a portion of a graphic, a color separation, an entire page for multi-page documents, watermarks, or a combination thereof.

29. The production device as recited in claim 27, wherein the particular resource of the shared resources container includes a part name, content type, and corresponding data.

30. The production device as recited in claim 29, wherein the part name of the particular resource and the particular resource reference comprise a uniform resource identifier (URI).

31. The production device as recited in claim 27, wherein the job container is organized by pages.

32. The production device as recited in claim 27, wherein the job container includes a plurality of embedded resources.

33. The production device as recited in claim 27, further comprising:
a database of downloaded shared resources that lists resources that have been sent to the utilization device, the utilization device including one or more of a resource displaying device, a resource archiving device, a resource distribution device, or a resource printing device.

34. The production device as recited in claim 27, wherein the utilization device uses the particular resource reference of the job container to retrieve the particular resource from the shared resources container when processing the job container.

35. The production device as recited in claim 27, wherein the job container includes a given resource that is marked as a shareable resource by a shareable resource marking, and wherein the shareable resource marking enables the utilization device to extract the given resource from the job container and to add the given resource to the shared resources container.

36. A system comprising:
a processor;
a memory to store components for execution by the processor, the components including:
a sharing component for sharing resources among utilization jobs, the sharing component including a plurality of resources;
a container component for storing a utilization job, the container component including (1) a plurality of references for referencing the plurality of resources, and (2) one or more embedded resources that are not reused in a subsequent container component, wherein the plurality of references uniformly reference the plurality of resources independently of resource type; and
a processing component to process the utilization job using the plurality of resources in the sharing component and the one or more embedded resources in the container component, the plurality of resources not being embedded in the container component,
wherein the one or more embedded resources includes an image.

37. The system as recited in claim 36, wherein the system comprises at least one of a production device or a utilization device or one or more storage media.

38. A method comprising:
downloading to a utilization device a shared resources container having a plurality of resources of different resource types;
formulating a job container that includes (1) a plurality of resource references pointing to the plurality of resources of different resource types in a uniform manner, and (2) a plurality of embedded resources of different resource types, the plurality of embedded resources being determined to not be reused in a subsequent job container;
downloading the job container that includes (1) the plurality of resource references, and (2) the plurality of embedded resources to the utilization device; and
processing the job container using (1) the plurality of embedded resources of different resource types in the job container, and (2) the plurality of resources of different resource types in the shared resources container that is referenced by the plurality of resource references included in the job container;
wherein the plurality of embedded resources includes an image.

* * * * *